United States Patent
Yamamoto et al.

(10) Patent No.: US 9,542,155 B2
(45) Date of Patent: Jan. 10, 2017

(54) PROXY CALCULATION SYSTEM, METHOD, REQUEST DEVICE AND PROGRAM THEREOF

(75) Inventors: Go Yamamoto, Tokyo (JP); Tetsutaro Kobayashi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 373 days.

(21) Appl. No.: 14/002,481

(22) PCT Filed: Mar. 2, 2012

(86) PCT No.: PCT/JP2012/055404
§ 371 (c)(1),
(2), (4) Date: Aug. 30, 2013

(87) PCT Pub. No.: WO2012/121152
PCT Pub. Date: Sep. 13, 2012

(65) Prior Publication Data
US 2013/0339413 A1  Dec. 19, 2013

(30) Foreign Application Priority Data
Mar. 4, 2011 (JP) ................. 2011-047840

(51) Int. Cl.
*G06F 7/58* (2006.01)
*H04L 9/00* (2006.01)

(52) U.S. Cl.
CPC . *G06F 7/58* (2013.01); *H04L 9/00* (2013.01); *H04L 2209/26* (2013.01)

(58) Field of Classification Search
CPC ............ G06F 7/58–7/588; H04L 9/008; H04L 2209/26
See application file for complete search history.

(56) References Cited

U.S. PATENT DOCUMENTS

| | | | | |
|---|---|---|---|---|
| 9,037,623 B2* | 5/2015 | Yamamoto | ................. | H04L 9/22 708/250 |
| 2013/0262863 A1* | 10/2013 | Yoshino | .................. | H04L 9/008 713/165 |
| 2013/0318360 A1* | 11/2013 | Yamamoto | ............ | G06F 21/602 713/189 |

OTHER PUBLICATIONS

Blum, Luby, and Rubinfeld, "Self-testing/Correcting with Applications to Numerical Programs", Proc. 22nd ACM STOC, pp. 73-83, 1990.*

(Continued)

*Primary Examiner* — Matthew Sandifer
(74) *Attorney, Agent, or Firm* — Oblon, McClelland, Maier & Neustadt, L.L.P.

(57) ABSTRACT

Where G and H are cyclic groups, M is an integer of two or more, i=1, ..., M, f is a homomorphic function of mapping a member $x_i$ of group H to group G, $R_i$ and $R_0$ are random variables with a value in group G, $r_i$ is a realized value of the random variable $R_i$, $r_0$ is a realized value of the random variable $R_0$, and $a_i$ is a random number of an integer of 0 or more, a random number generation unit 11 generates random numbers $a_1, a_2, \ldots, a_M$. A sampler 21 is capable of calculating $f(x_1)r_1, f(x_2)r_2, \ldots, f(x_M)r_M$ to obtain a calculation result thereof as $z_1, z_2, \ldots, z_M$, respectively. A power calculation unit 12 calculates $(z_1)^{a_1}, (z_2)^{a_2}, \ldots, (z_M)^{a_M}$. An extended randomizable sampler 22 is capable of calculating $f(x_1^{a_1} \times x_2^{a_2} \times \ldots \times x_M^{a_M})r_0$ to obtain a calculation result $z_0$ thereof. A determination unit 16 determines whether or not $(z_1)^{a_1} \times (z_2)^{a_2} \times \ldots \times (z_M)^{a_M} = z_0$.

7 Claims, 3 Drawing Sheets

(56) References Cited

OTHER PUBLICATIONS

Yamamoto, Go et al., "Self-Correctors for Cryptographic Modules", The 2011 Symposium on Cryptography and Information Security, 2F1-1, pp. 1-8, (Jan. 25-28, 2011).
Bellare, J. et al., "Fast Batch Verification for Modular Exponentiation and Digital Signatures", Advances in Cryptology-Eurocrypt '98, LNCS 1403, pp. 236-250, (1998).
Chida, K. et al., "Batch Processing of Interactive Proofs", Topics in Cryptology-CT-RSA2007, LNCS 4377, pp. 196-207, (2007).
International Search Report Issued Apr. 10, 2012 in PCT/JP12/055404 Filed Mar. 2, 2012.
Extended European Search Report issued Feb. 25, 2015 in Patent Application No. 12755320.4.
Elena Grigorescu, et al., "Local Decoding and Testing for Homomorphisms" Approximation, Randomization, and Combinatorial Optimization. Algorithms and Techniques Lecture Notes in Computer Science, XP019039358, Jan. 1, 2006, pp. 375-385.
Koji Chida, et al., "Batch Processing for Proofs of Partial Knowledge and Its Applications" IEICE Transactions on Fundamentals of Electronics, Communications and Computer Sciences, vol. E91-A, No. 1, XP001509989, Jan. 1, 2008, pp. 150-159.
Office Action issued on Apr. 15, 2016 in European Patent Application No. 12 755 320.4.
Decision to Refuse mailed Nov. 28, 2016, in European Patent Application No. 12755320.4.

\* cited by examiner

PROXY CALCULATION SYSTEM

PROXY CALCULATION SYSTEM, METHOD, REQUEST DEVICE AND PROGRAM THEREOF

TECHNICAL FIELD

The present invention relates to a calculation technique using a computer. In particular, it relates to a technique of performing calculation using a result of calculation performed by another calculator.

BACKGROUND ART

The inventor has proposed a technique of calculating $f(x)$ for an input x using a randomizable sampler and a sampler described below (for example, refer to Non-patent literature 1).

R is defined as a random variable with a value in group G. What returns $w^a r'$ corresponding to a sample r' in accordance with the random variable R every time an integer a of 0 or more for w∈G is given is referred to as a randomizable sampler with an error R for w. In the randomizable sampler, distribution of the random variable R is unrelated to the integer a.

In addition, what returns wr' corresponding to the sample r' in accordance with the random variable R every time a demand is received in w∈G is referred to as a sampler with an error R for w.

The randomizable sampler and the sampler calculate $w^a r'$ and wr', respectively, using a function called black box.

In a case that, when $r_1$ and $r_2$ are realized values of the random variable R, an output $f(x)^a r_1$ of the randomizable sampler with an error R for $f(x)$ is equal to the a-th power $(f(x)r_2)^a$ of an output $f(x)r_2$ of the sampler with an error R for $f(x)$, $r_1$ and $r_2$ are unit elements $e_g$ of group G with high probability. Accordingly, since $f(x)r_2=f(x)e_g=f(x)$ in this case, the output $f(x)r_2$ of the sampler becomes $f(x)$ intended to be obtained.

PRIOR ART LITERATURE

Non-Patent Literature

Non-patent literature 1: Go Yamamoto, Tetsutaro Kobayashi, "Self-Correctors for Cryptographic Modules", The 2011 Symposium on Cryptography and Information Security, 2F1-1, 2001.

SUMMARY OF THE INVENTION

Problems to be Solved by the Invention

In the technique described in Background Art, in order to calculate a value of $f(x)$ for certain x, it is necessary to make the randomizable sampler and the sampler calculate at least twice using the black box function. Therefore, when M is an integer of two or more, in order to calculate $f(x_1)$, $f(x_2)$, ..., $f(x_M)$, respectively, for M items of inputs of $x_1$, $x_2$, ..., $x_M$, it is necessary to make the randomizable sampler and the sampler calculate at least 2M times using black box. This is because it is necessary to make the randomizable sampler and the sampler calculate at least twice using black box for the respective M items of inputs of $x_1, x_2, \ldots, x_M$.

It is an object of the present invention is to provide a technique of calculating $f(x_1)$, $f(x_2)$, ..., $f(x_M)$, respectively, for M items of inputs of $x_1, x_2, \ldots, x_M$ while reducing the number of times to calculate using black box to less than 2M times.

Means to Solve the Problems

According to an aspect of the present invention, random numbers $a_1, a_2, \ldots, a_M$ are generated. It is enabled to calculate $f(x_1)r_1, f(x_2)r_2, \ldots, f(x_M)r_M$ to obtain a calculation result thereof as $z_1, z_2, \ldots, z_M$, respectively. $(z_1)^{a_1}$, $(z_2)^{a_2}, \ldots, (z_M)^{a_M}$ is calculated. It is enabled to calculate $f(x_1^{a_1} \times x_2^{a_2} \times \ldots \times x_M^{a_M})r_0$ to obtain a calculation result $z_0$ thereof. It is determined whether or not $(z_1)^{a_1} \times (z_2)^{a_2} \times \ldots \times (z_M)^{a_M} = z_0$, where G and H are cyclic groups, M is an integer of two or more, i=1, ..., M, f is a homomorphic function of mapping a member $x_i$ of group H to group G, $R_i$ and $R_0$ are random variables with a value in group G, $r_i$ is a realized value of the random variable $R_i$, $r_0$ is a realized value of the random variable $R_0$, and $a_i$ is a random number of an integer of 0 or more.

Effects of the Invention

It is enabled to make the number of times to calculate using black box a minimum of M+1 times.

DETAILED DESCRIPTION OF THE EMBODIMENTS

Figure 1:
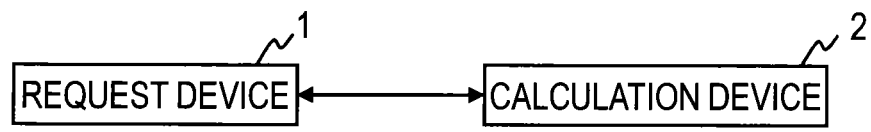
FIG. 1 is a block diagram illustrating configuration of a proxy calculation system of an embodiment.
Figure 2:
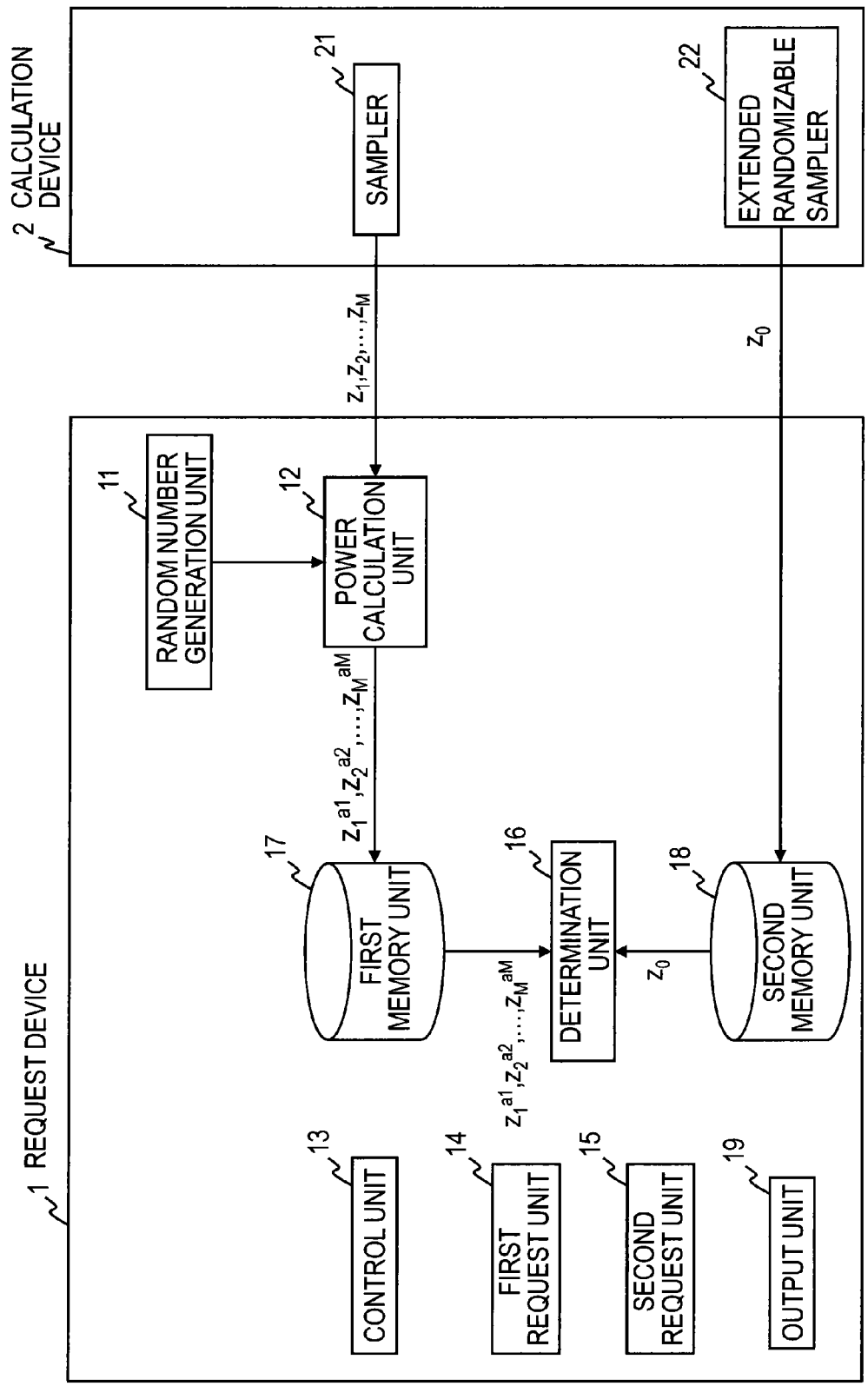
FIG. 2 is a block diagram illustrating configuration of a request device and a calculation device of an embodiment.

Descriptions are given below to an embodiment of the present invention with reference to the drawings.

G and H are cyclic groups, M is an integer of two or more, i=1, ..., M, f is a homomorphic function of mapping a member $x_i$ of group H to group G, $R_i$ and $R_0$ are random variables with a value in group G, $r_i$ is a realized value of the random variable $R_i$, $r_0$ is a realized value of the random variable $R_0$, and $a_i$ is a random number of an integer of 0 or more.

A random number generation unit 11 of a request device 1 generates random numbers $a_1, a_2, \ldots, a_M$ of integers of 0 or more (step S1). Information on the random numbers $a_1, a_2, \ldots, a_M$ thus generated is sent to a power calculation unit 12 and a calculation device 2.

A control unit 13 substitutes 1 for t (step S2).

A first request unit 14 of the request device 1 transmits request information to request calculation of $f(x_1)r_1$, $f(x_2)r_2, \ldots, f(x_M)r_M$ to the calculation device 2 (step S3). For example, the request information includes $x_1, x_2, \ldots, x_M$ as members of group H. When the calculation device 2 is capable of calculating $f(x_1)r_1$, $f(x_2)r_2, \ldots, f(x_M)r_M$, the request information does not necessarily include $x_1, x_2, \ldots, x_M$.

A sampler 21 of the calculation device 2 is capable of calculating $f(x_1)r_1, f(x_2)r_2, \ldots, f(x_M)r_M$, and those calculation results are $z_1, z_2, \ldots, z_M$, respectively (step S4). The calculation results $z_1, z_2, \ldots, z_M$ are transmitted to the request device 1. That is, the calculation result for $f(x_1)r_1$ becomes $z_1$, the calculation result for $f(x_2)r_2$ becomes $z_2$, ..., and the calculation result for $f(x_M)r_M$ becomes $z_M$.

Herein, to be capable of calculating means to be possible to calculate with probability of not less than non-negligible probability. The non-negligible probability is probability of not less than $1/\Phi(k)$ where a polynomial as a monotone non-decreasing function for a security parameter k is a polynomial $\Phi(k)$.

Here, to calculate f(x)r is to calculate a value of a formula defined as f(x)r. As long as it is possible to finally calculate the value of the formula f(x)r, the method of calculation in the middle does not matter. This is similar for calculation of other formulae herein.

The power calculation unit 12 of the request device 1 raises the calculation results $z_1, z_2, \ldots, z_M$ to the power of $a_1, a_2, \ldots, a_M$, respectively (step S5). That is, it calculates $(z_1)^{a_1}, (z_2)^{a_2}, \ldots, (z_M)^{a_M}$. In a first memory unit 17, $(z_1)^{a_1}$, $(z_2)^{a_2}, \ldots, (z_M)^{a_M}$ are memorized.

Here, where i=1, 2, ..., M, ai as the superscripts on the right of $(z_i)$ means $a_i$. In such a manner herein, in a case of expressing as $\alpha^{\beta\gamma}$ where $\alpha$ is a first character, $\beta$ is a second character, and $\gamma$ is a numeral, that $\beta\gamma$ means $\beta_\gamma$, that is, $\beta$ with a subscript $\gamma$.

A second request unit 15 of the request device 1 transmits request information to request calculation of $f(x_1^{a_1} \times x_2^{a_2} \times \ldots \times x_M^{a_M})r_0$ to the calculation device 2 (step S6). For example, the request information includes $x_1, x_2, \ldots, x_M$ as members of group H. As long as the calculation device 2 is capable of calculating $f(x_1)r_1, f(x_2)r_2, \ldots, f(x_M)r_M$, the request information does not necessarily include $x_1, x_2, \ldots, x_M$.

An extended randomizable sampler 22 of the calculation device 2 is capable of calculating $f(x_1^{a_1} \times x_2^{a_2} \times \ldots \times x_M^{a_M})r_0$, and the calculation result is $z_0$ (step S7). The calculation result $z_0$ is transmitted to the request device 1 and memorized in a second memory unit 18 of the request device 1.

The extended randomizable sampler 22 is to randomize $f(x_1 \times x_2 \times \ldots \times x_M)$ using random numbers $a_1, a_2, \ldots, a_M$ while an error is given based on a random variable $R_0$ having distribution independent of the random numbers $a_1, a_2, \ldots, a_M$.

The extended randomizable sampler 22 calculates a value of $f(x_1^{a_1} \times x_2^{a_2} \times \ldots \times x_M^{a_M})r_0$ using a probability function F as a black box that takes, for example, $x_1^{a_1} \times x_2^{a_2} \times \ldots \times x_M^{a_M} h^s$ as an argument. That is, the extended randomizable sampler 22 calculates a value of, for example, $F(x_1^{a_1} \times x_2^{a_2} \times \ldots \times x_M^{a_M} h^s)f(h)^{-s}$ to get $z_0$. Here, h is a generator of group H and s is a random number of an integer of 0 or more. Here, the probability function F is a probability function that outputs a value same as the function f with probability of not less than predetermined probability. That is, $F(x_c)=f(x_c)$ holds for an arbitrary input $x_c \in H$ with probability of not less than predetermined probability.

Where U is uniform distribution of group H and the random variable $R_0=F(U)f(U)^{-1}$, the distribution of $F(x_1^{a_1} \times x_2^{a_2} \times \ldots \times x_M^{a_M} h^s)f(h)^{-s}$ becomes equal to the distribution of $f(x_1^{a_1} \times x_2^{a_2} \times \ldots \times x_M^{a_M})R_0$. It is because $F(x_1^{a_1} \times x_2^{a_2} \times \ldots \times x_M^{a_M} h^s)f(h)^{-s} = f(x_1^{a_1} \times x_2^{a_2} \times \ldots \times x_M^{a_M} h^s)R_0 f(h)^{-s} = f(x_1^{a_1} \times x_2^{a_2} \times \ldots \times x_M^{a_M})f(h)^s R_0 f(h)^{-s} = f(x_1^{a_1} \times x_2^{a_2} \times \ldots \times x_M^{a_M})R_0$. In the development of the formula described above, due to the property as a homomorphic function of f and $R_0=F(U)f(U)^{-1}=F(x_1^{a_1} \times x_2^{a_2} \times \ldots \times x_M^{a_M} h^s)f(x_1^{a_1} \times x_2^{a_2} \times \ldots \times x_M^{a_M} h^s)^{-1}$, a property of $F(x_1^{a_1} \times x_2^{a_2} \times \ldots \times x_M^{a_M} h^s) = f(x_1^{a_1} \times x_2^{a_2} \times \ldots \times x_M^{a_M} h^s)R_0$ is used.

A determination unit 16 of the request device 1 determines whether or not $(z_1)^{a_1} \times (z_2)^{a_2} \times \ldots \times (z_M)^{a_M} = z_0$ using $(z_1)^{a_1}, (z_2)^{a_2}, \ldots, (z_M)^{a_M}$ loaded from the first memory unit 17 and $z_0$ loaded from the second memory unit 18 (step S8).

In a case of $(z_1)^{a_1} \times (z_2)^{a_2} \times \ldots \times (z_M)^{a_M} = z_0$, then $z_1, z_2, \ldots, z_M$ in that case become $f(x_1), f(x_2), \ldots, f(x_M)$, respectively, as described later. Therefore, an output unit 19 outputs $z_1, z_2, \ldots, z_M$ in that case as $f(x_1), f(x_2), \ldots, f(x_M)$, respectively (step S9).

In a case of $(z_1)^{a_1} \times (z_2)^{a_2} \times \ldots \times (z_M)^{a_M} = z_0$, then $(f(x_1)r_1)^{a_1} \times (f(x_2)r_2)^{a_2} \times \ldots \times (f(x_M)r_M)^{a_M} = f(x_1^{a_1} \times x_2^{a_2} \times \ldots \times x_M^{a_M})r_0$, and considering that the function f is a homomorphic function, $r_1^{a_1} \times r_2^{a_2} \times \ldots \times r_M^{a_M} = r_0$. The inventor has found that, in this case, there is a very high possibility that $r_1, r_2, \ldots, r_M$ are unit elements $e_g$ of group G.

This is because, firstly, by the principle of proxy calculation described in Non-patent literature 1, determination of whether or not $(z_1)^{a_1} \times (z_2)^{a_2} \times \ldots \times (z_M)^{a_M} = z_0$ enables to determine whether or not $z_0 = f(x_1^{a_1} \times x_2^{a_2} \times \ldots \times x_M^{a_M})$ with very high probability. Secondly, since $f(x_1^{a_1} \times x_2^{a_2} \times \ldots \times x_M^{a_M}) = f(x_1)^{a_1} \times f(x_2)^{a_2} \times \ldots \times f(x_M)^{a_M}$ holds, $z_0 = f(x_1)^{a_1} \times f(x_2)^{a_2} \times \ldots \times f(x_M)^{a_M}$ holds where $z_0 = f(x_1^{a_1} \times x_2^{a_2} \times \ldots \times x_M^{a_M})$. Thirdly, when repeatedly executing an arbitrary method of calculating $z_0 = f(x_1^{a_1} \times x_2^{a_2} \times \ldots \times x_M^{a_M})$ where $a_i$ is a random number of an integer of 0 or more, it is possible to derive $f(x_i)$ for each i from $z_0 = f(x_1)^{a_1} \times f(x_2)^{a_2} \times \ldots \times f(x_M)^{a_M}$ using methods described in Reference Literatures 1 and 2. Fourthly, in a method very same as the method used in the third reason, it is also possible to derive $z_i$ for each i from $(z_1)^{a_1} \times (z_2)^{a_2} \times \ldots \times (z_M)^{a_M}$ by using the very value same as the integer $a_i$ used in the third reason. As just described, when $(z_1)^{a_1} \times (z_2)^{a_2} \times \ldots \times (z_M)^{a_M} = z_0 = f(x_1^{a_1} \times x_2^{a_2} \times \ldots \times x_M^{a_M}) = f(x_1)^{a_1} \times f(x_2)^{a_2} \times \ldots \times f(x_M)^{a_M}$, there is a very high possibility that $z_i = f(x_i)$ for each i. Accordingly, when $(z_1)^{a_1} \times (z_2)^{a_2} \times \ldots \times (z_M)^{a_M} = z_0$, there is a very high possibility that $r_1, r_2, \ldots, r_M$ are unit elements $e_g$ of group G.

Reference Literature 1: M. Bellare, J. Garay, and T. Rabin, "Fast Batch Verification for Modular Exponentiation and Digital Signatures," Advances in Cryptology-EUROCRYPT '98, LNCS 1403, pp. 236-250, Springer-Verlag, 1998.

Reference Literature 2: K. Chida and G. Yamamoto, "Batch Processing of Interactive Proofs," Topics in Cryptology-CT-RSA2007, LNCS 4377, pp. 196-207, Springer, 2007.

Therefore, in a case of $(z_1)^{a_1} \times (z_2)^{a_2} \times \ldots \times (z_M)^{a_M} = z_0$, then $z_1 = f(x_1)r_1 = f(x_1)e_g = f(x_1)$, $z_2 = f(x_2)r_2 = f(x_2)e_g = f(x_2), \ldots$, and $z_M = f(x_M)r_M = f(x_M)e_g = f(x_M)$.

The control unit 13 determines whether or not t=T (step S10). T is a preset integer of not less than 1. As long as t=T, the output unit 19 outputs information of not being capable of calculation, for example, a symbol "⊥" (step S11) and the process is terminated. In a case of not t=T, the control unit 13 increments t by one, that is, substitutes t+1 for t (step S12) and the process goes back to step S3.

Information of not being capable of calculation (in this example, the symbol "⊥") means that reliability of the calculation device 2 correctly performing calculation is below the standard defined by T. In other words, it means that correct arithmetic operations are not performed repeatedly in T times.

After step S12, similar to the above, the request device 1 causes the calculation device 2 to calculate all or part of $z_1, z_2, \ldots, z_M$ (steps S3, S4). The power calculation unit 12 performs the power of all or part of calculated $z_1, z_2, \ldots, z_M$, respectively, using corresponding random numbers $a_1, a_2, \ldots, a_M$ (step S5). The powered $(z_1)^{a_1}, (z_2)^{a_2}, \ldots, (z_M)^{a_M}$ are memorized in the first memory unit 17.

In the process of step S8, in a case that at least one of $z_0$, $(z_1)^{a1}, (z_2)^{a2}, \ldots, (z_M)^{aM}$ are memorized in a plurality in the first memory unit 17 and the second memory unit 18, the determination unit 16 determines whether or not the relationship of $(z_1)^{a1} \times (z_2)^{a2} \times \ldots \times (z_M)^{aM} = z_0$ is satisfied, respectively, for all sets $(z_0, (z_1)^{a1}, (z_2)^{a2}, \ldots, (z_M)^{aM})$ of $z_0, (z_1)^{a1}, (z_2)^{a2}, \ldots, (z_M)^{aM}$ configured by selecting each one from $z_0, (z_1)^{a1}, (z_2)^{a2}, \ldots, (z_M)^{aM}$, respectively, memorized in the first memory unit 17 and the second memory unit 18 (step S8).

For example, where $k_0, k_1, \ldots, k_M$ are integers of 1 or more, $k_0$ items of $z_0$, $k_1$ items of $z_1, \ldots, k_M$ items of $z_M$ are memorized in the first memory unit 17 and the second memory unit 18. In this case, there are $k_0 \times k_1 \times k_2 \times \ldots \times k_M$ items of a set $(z_0, (z_1)^{a1}, (z_2)^{a2}, \ldots, (z_M)^{aM})$ of $z_0, (z_1)^{a1}, (z_2)^{a2}, \ldots, (z_M)^{aM}$ configured by selecting each one from $z_0, (z_1)^{a1}, (z_2)^{a2}, \ldots, (z_M)^{aM}$, respectively, memorized in the first memory unit 17 and the second memory unit 18. Accordingly, the determination unit 16 determines whether or not the relationship of $(z_1)^{a1} \times (z_2)^{a2} \times \ldots \times (z_M)^{aM} = z_0$ is satisfied, respectively, for $k_0 \times k_1 \times k_2 \times \ldots \times k_M$ items of a set $(z_0, (z_1)^{a1}, (z_2)^{a2}, \ldots, (z_M)^{aM})$.

In a case of satisfying the relationship of $(z_1)^{a1} \times (z_2)^{a2} \times \ldots \times (z_M)^{aM} = z_0$ in the process of step S8 for the first time, the sampler 21 performs calculation of $z_1, z_2, \ldots, z_M$ using black box M times and the extended randomizable sampler 22 performs calculation of $z_0$ using black box F once, and thus the number of times to refer to black box is M+1 times in total. In such a manner, it is enabled to make the number of times to calculate using black box to be a minimum of M+1 times.

Modifications

The random variable $R_0, R_1, \ldots, R_M$ may be same and may also be different.

The random number generation unit 11 generates uniform random numbers, thereby making the safety of the proxy calculation system highest. However, in a case that the intended safety level is not so high, the random number generation unit 11 may also generate random numbers that are not uniform random numbers.

In addition, the request device 1 may also provide a plurality of types of request information to the calculation device 2 in collection to obtain a plurality of corresponding $z_0, z_1, z_2, \ldots, z_M$ in collection. This enables to reduce the number of times to communicate between the request device 1 and the calculation device 2.

The communication of data between each unit of the request device 1 and the calculation device 2 may be performed directly and may also be via a memory unit, not shown.

Other than them, the present invention is not limited to the above embodiment. For example, the above various types of process may not only be executed in time series in accordance with the description, but also be executed in parallel or individually in accordance with the capacity of the device that executes the process or necessity.

Figure 3:
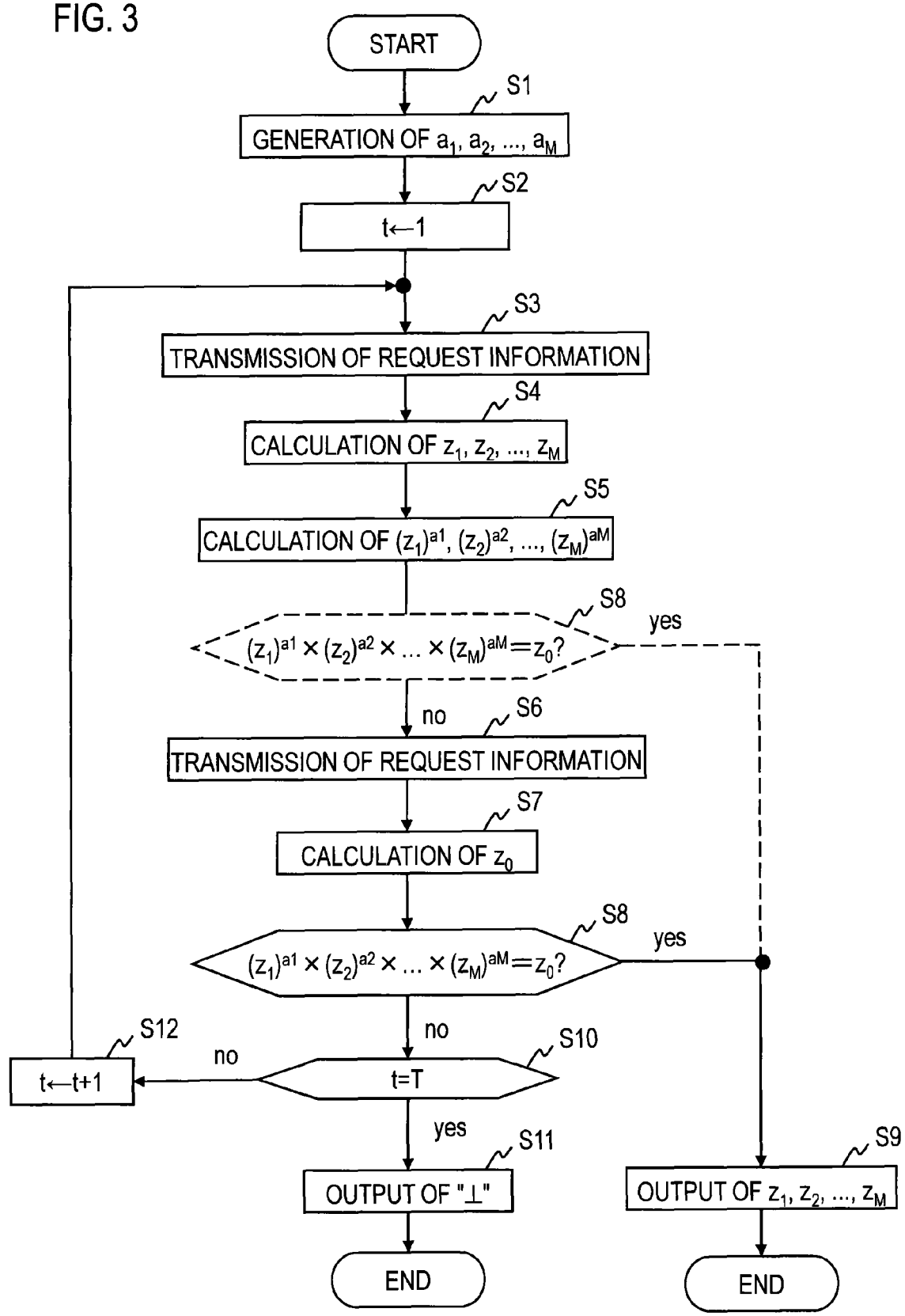
FIG. 3 is a flowchart showing process in a proxy calculation system of an embodiment.

For example, in a case that at least one of $z_0, (z_1)^{a1}, (z_2)^{s2}, \ldots, (z_M)^{aM}$ are memorized in plural in the first memory unit 17 and the second memory unit 18, as illustrated with broken lines in FIG. 3, the determination unit 16 may also perform process in step S8 between steps S5 and S6.

In addition, in a case that the above configuration is achieved using a computer, the process contents of functions that each device should have is described by a program. Then, the program is executed using a computer, thereby achieving the above process function on the computer.

It is enabled to store the program in which the process contents are described in a computer-readable storage medium. The computer-readable storage medium may include, for example, a magnetic storage device, an optical disk, a magneto-optical storage medium, a semiconductor memory, and the like.

Other than those, appropriate modifications are naturally made within the scope of the present invention.

What is claimed is:

1. A proxy calculation system comprising:
   request processing circuitry configured to generate random numbers $a_1, a_2, \ldots, a_M$; and
   calculation processing circuitry configured to calculate $f(x_1)r_1, f(x_2)r_2, f(x_M)r_M$ to obtain a calculation result thereof as $z_1, z_2, \ldots, z_M$, respectively,
   wherein the request processing circuitry is further configured to calculate $(z_1)^{a1}, (z_2)^{a2}, \ldots, (z_M)^{aM}$,
   the calculation processing circuitry is further configured to calculate $f(x_1^{a1} \times x_2^{a2} \times \ldots \times x_M^{aM})r_0$ to obtain a calculation result $z_0$ thereof,
   the request processing circuitry of the request device is further configured to determine whether or not $(z_1)^{a1} \times (z_2)^{a2} \times \ldots \times (z_M)^{aM} = z_0$,
   wherein when the request processing circuitry determines that $(z_1)^{a1} \times (z_2)^{a2} \times \ldots \times (z_M)^{aM}$ does not equal $z_0$, the proxy calculation system performs at least one more iteration of calculations that is less than or equal to a predetermined number of iterations to determine whether or not $(z_1)^{a1} \times (z_2)^{a2} \times \ldots \times (z_M)^{aM} = z_0$, and the request processing circuitry terminates the calculations and outputs a determination result that indicates that the calculation processing circuitry does not operate within a predetermined standard of reliability when $(z_1)^{a1} \times (z_2)^{a2} \times \ldots \times (z_M)^{aM}$ is not determined to equal $z_0$ after the predetermined number of iterations have been performed, and
   wherein G and H are cyclic groups, M is an integer of two or more, $i=1, \ldots, M$, f is a homomorphic function of mapping a member $x_i$ of group H to group G, $R_i$ and $R_0$ are random variables with a value in group G, $r_i$ is a realized value of the random variable $R_i$, $r_0$ is a realized value of the random variable $R_0$, and $a_i$ is a random number of an integer of 0 or more.

2. The proxy calculation system according to claim 1, wherein
   where a probability function that outputs a value same as the function f with probability of not less than predetermined probability is F, a generator of group H is h, and a random number of an integer of 0 or more is s,
   the calculation processing circuitry calculates a value of $F(x_1^{a1} \times x_2^{a2} \times \ldots \times x_M^{aM} h^s) f(h)^{-s}$ to get a calculation result thereof as $z_0$.

3. A proxy calculation method, implemented by a proxy calculation system, where G and H are cyclic groups, M is an integer of two or more, $i=1, \ldots, M$, f is a homomorphic function of mapping a member $x_i$ of group H to group G, $R_i$ and $R_0$ are random variables with a value in group G, $r_i$ is a realized value of the random variable $R_i$, $r_0$ is a realized value of the random variable $R_0$, and $a_i$ is a random number of an integer of 0 or more, the method comprising:
   generating, by a request device having processing circuitry, random numbers $a_1, a_2, \ldots, a_M$;

calculating, by a calculation device having processing circuitry, $f(x_1)r_1, f(x_2)r_2, \ldots, f(x_M)r_M$ to obtain a calculation result thereof as $z_1, z_2, \ldots, z_M$, respectively;

calculating, by the request device, $(z_1)^{a1}, (z_2)^{a2}, \ldots, (z_M)^{aM}$;

calculating, by the calculation device, $f(x_1^{a1} \times x_2^{a2} \times \ldots \times x_M^{aM})r_0$ to obtain a calculation result $z_0$ thereof;

determining, by the request device, whether or not $(z_1)^{a1} \times (z_2)^{a2} \times \ldots \times (z_M)^{aM} = z_0$, wherein when the request device determines that $(z_1)^{a1} \times (z_2)^{a2} \times \ldots \times (z_M)^{aM}$ does not equal $z_0$, the proxy calculation system performs at least one more iteration of calculations that is less than or equal to a predetermined number of iterations to determine whether or not $(z_1)^{a1} \times (z_2)^{a2} \times \ldots \times (z_M)^{aM} = z_0$, and the method includes, by the request device, terminating the calculations and outputting a determination result that indicates that the calculation device does not operate within a predetermined standard of reliability when $(z_1)^{a1} \times (z_2)^{a2} \times \ldots \times (z_M)^{aM}$ is not determined to equal $z_0$ after the predetermined number of iterations have been performed.

4. The proxy calculation method according to claim 3, wherein where a probability function that outputs a value same as the function f with probability of not less than predetermined probability is F, a generator of group H is h, and a random number of an integer of 0 or more is s, the calculation device calculates a value of $F(x_1^{a1} \times x_2^{a2} \times \ldots \times x_M^{aM} h^s) f(h)^{-s}$ to get a calculation result thereof as $z_0$.

5. A request device comprising:

processing circuitry configured to generate random numbers $a_1, a_2, \ldots, a_M$;

calculate $(z_1)^{a1}, (z_2)^{a2}, \ldots, (z_M)^{aM}$ using a calculation result $z_1, z_2, \ldots, z_M$ by a calculation device, that includes calculation processing circuitry, that calculates $f(x_1)r_1, f(x_2)r_2, \ldots, f(x_M)r_M$;

determine whether or not $(z_1)^{a1} \times (z_2)^{a2} \times \ldots \times (z_M)^{aM} = z_0$ using the calculation result of the processing circuitry and a calculation result $z_0$ by the calculation device that further calculates $f(x_1^{a1} \times x_2^{a2} \times \ldots \times x_M^{aM})r_0$, wherein when the processing circuitry determines that $(z_1)^{a1} \times (z_2)^{a2} \times \ldots \times (z_M)^{aM}$ does not equal $z_0$, the request device and the calculation device are configured to perform at least one more iteration of calculations that is less than or equal to a predetermined number of iterations to determine whether or not $(z_1)^{a1} \times (z_2)^{a2} \times \ldots \times (z_M)^{aM} = z_0$, and the processing circuitry terminates the calculations and outputs a determination result that indicates that the calculation device does not operate within a predetermined standard of reliability when $(z_1)^{a1} \times (z_2)^{a2} \times \ldots \times (z_M)^{aM}$ is not determined to equal $z_0$ after the predetermined number of iterations have been performed, and wherein G and H are cyclic groups, M is an integer of two or more, $i=1, \ldots, M$, f is a homomorphic function of mapping a member $x_i$ of group H to group G, $R_i$ and $R_0$ are random variables with a value in group G, $r_i$ is a realized value of the random variable $R_i$, $r_0$ is a realized value of the random variable $R_0$, and $a_i$ is a random number of an integer of 0 or more.

6. The request device according to claim 5, wherein where a probability function that outputs a value same as the function f with probability of not less than predetermined probability is F, a generator of group H is h, and a random number of an integer of 0 or more is s, the calculation device calculates a value of $F(x_1^{a1} \times x_2^{a2} \times \ldots \times x_M^{aM} h^s) f(h)^{-s}$ to get a calculation result thereof as $z_0$.

7. A non-transitory computer-readable storage medium in which a program causing a computer to function as the request device according to claim 5 or 6 is stored.

* * * * *